(12) United States Patent
Asoma

(10) Patent No.: US 6,459,672 B1
(45) Date of Patent: Oct. 1, 2002

(54) OPTICAL HEAD AND OPTICAL DISC DEVICE

(75) Inventor: Yoshito Asoma, Saitama (JP)

(73) Assignee: Sony Corporation (JP)

( * ) Notice: Subject to any disclaimer, the term of this patent is extended or adjusted under 35 U.S.C. 154(b) by 52 days.

(21) Appl. No.: 09/669,657

(22) Filed: Sep. 26, 2000

(30) Foreign Application Priority Data

Sep. 28, 1999 (JP) ............................................ 11-274745

(51) Int. Cl.[7] ................................................ G11B 7/00
(52) U.S. Cl. .................... 369/112.01; 369/120; 369/121
(58) Field of Search ........................... 369/44.37, 44.41, 369/112.01, 112.05, 120, 121, 124.03, 112.28

(56) References Cited

U.S. PATENT DOCUMENTS 6,272,098 B1 * 8/2001 Takahashi et al. ..... 369/112.17
6,285,646 B1 * 9/2001 Yoo et al. ............... 369/112.26
6,304,542 B1 * 10/2001 Dang et al. ............ 369/112.23

* cited by examiner

*Primary Examiner*—Paul W. Huber
(74) *Attorney, Agent, or Firm*—Ronald P. Kananen; Rader, Fishman & Grauer PLLC

(57) ABSTRACT

An optical head includes a (1) light radiating unit in which the relative positions of first and second light sources are set so that a straight line interconnecting a spot position of the laser light illuminated on an optical disc and a spot position of the second laser light similarly illuminated on the optical disc will be 45±15° with respect to a recording track on the optical disc and (2) a light receiving element having plural light receiving sections arranged substantially parallel to a splitting line substantially parallel to the straight line which interconnects the spot position of the laser light illuminated on an optical disc and the spot position of the second laser light similarly illuminated on the optical disc and which is projected on the optical disc. Each of the light receiving sections is split into four portions by a splitting line substantially parallel to the recording track on a signal recording surface of the optical disc and by a splitting line substantially perpendicular to it. With this configuration, focusing error signals can be properly detected by the astigmatic method in an optical head adapted for coping with plural optical heads of different kinds, while the head can be reduced in size.

20 Claims, 5 Drawing Sheets

OPTICAL HEAD AND OPTICAL DISC DEVICE

BACKGROUND OF THE INVENTION

1. Field of the Invention

This invention relates to an optical head for coping with plural optical recording mediums of different kinds and to an optical disc device for recording and/or reproducing signals for plural optical recording mediums of different kinds using this optical head.

2. Description of Related Art

Up to now, a replay-only optical disc, termed a compact disc (CD), or a write-once optical, disc termed a CD-R (Compact Disc Recordable), has been put to practical utilization. These optical discs have been in widespread use because the discs are superior in mass-producibility and can be manufactured at low cost, while being usable for recording or reproducing the information in high stability.

Meanwhile, in these optical discs, the recent tendency is towards higher recording capacity. Amidst this tendency, the DVD (Digital Versatile Disc/Digital Video Disc) which, despite the fact that its outer diameter is equal to that of the CD, has a drastically improved recording capacity, such that data corresponding to an entire motion picture can be stored therein with a picture quality comparable to a current television broadcast, has been developed and put to practical utilization. In this DVD, a laser light shorter in wavelength than the laser used for a CD is used for recording and/or reproducing the information in order to elevate the recording density to increase the recording capacity.

As to an optical disc device employing a so-called compatible optical disc as a recording medium, such an optical disc device has been developed in which there is provided an optical head capable of recording and/or reproducing not only the information for the DVD but also that for the CD or CD-R.

Meanwhile, in the optical head capable of accommodating both the CD or the CD-R and the DVD, the optical system for the CD or the CD-R desirably has as many portions in common with the optical system for the DVD as possible, in order to reduce the overall size of the head or to lower the production cost.

In order to meet this demand, development of an optical head having a so-called double-wavelength semiconductor laser for selectively radiating the laser light for coping with the CD or the CD-R and the laser light for coping with the DVD is underway. In the double-wavelength semiconductor laser, a light source for radiating the laser light designed for coping with the CD or the CD-R and a light source for radiating the laser light designed for coping with the DVD are arranged in proximity to each other and are housed in the same package.

In such optical head, it also is proposed to arrange an optical component in the form of a flat parallel plate in an optical path obliquely and to impart the function of a beam splitter to this optical component. If the optical component in the form of a flat parallel plate is used as a beam splitter, the return light beam of respective laser light beams transmitted through this optical component and subsequently reflected back from the optical disc is subjected to astigmatic aberration. If this astigmatic aberration is utilized to detect focussing error signals, there is no necessity for providing dedicated optical components, thus simplifying the structure.

However, in this double-wavelength seimconductor laser, there are imposed limitations on the mounting position of a photodetector adapted for receiving the return beams of the respective light beams reflected back from the optical disc, such that, if the respective light sources and the light receiving portions are not arranged at proper positions, focussing error signals cannot be detected properly with the aid of astigmatic aberration.

SUMMARY OF THE INVENTION

It is, therefore, an object of the present invention to provide an optical head adapted for coping with plural optical recording mediums of different kinds and which enables focussing error signals to be detected properly by the astigmatic method while enabling the overall size of the optical head to be reduced. It is another object of the present invention to provide an optical disc device which enables signals to be recorded and/or reproduced properly to or from the plural optical recording mediums of different kinds using the optical head.

In one aspect, the present invention provides an optical head for coping with a plurality of optical recording mediums of different types, including light radiating means including a first light source for radiating the first laser light and a second light source for radiating the second laser light having a wavelength different from that of the first laser light, the first and second light sources being housed in the same package, light converging means for converging the laser light from the light radiating means towards the optical recording medium, a beam splitter substantially in the form of a flat plate for separating the optical path of the laser light proceeding towards the optical recording medium from that of the laser light reflected from the optical recording medium and for producing astigmatic aberration in the return laser light and light receiving means for receiving the return laser light reflected back from the optical recording medium. The relative positions of the first and second light sources of the light radiating means are set so that a straight line interconnecting a spot position of the first laser light illuminated on the optical recording medium and a spot position of the second laser light illuminated on the optical recording medium will be in a range of 45±15° with respect to a recording track of the optical recording medium. The light receiving means includes a pair of light receiving sections arranged substantially parallel to a straight line projected on the optical recording medium, the straight line being a straight line interconnecting a spot position of the first laser light illuminated on the optical recording medium and a spot position of the second laser light illuminated on the optical recording medium. Each of the light receiving sections is split into four portions by a splitting line substantially parallel to the recording track on a signal recording surface of the optical recording medium and a splitting line substantially perpendicular thereto.

In another aspect, the present invention provides an optical head for coping with a plurality of optical discs of different types, including a semiconductor laser including a first light source for radiating the first laser light and a second light source for radiating the second laser light having a wavelength different from that of the first laser light, the first and second light sources being housed in the same package in proximity to each other, with the semiconductor laser selectively emitting the first laser light or the second laser light depending on the disc type, an objective lens for converging the laser light from the semiconductor laser on the optical disc, a beam splitter for separating the optical path of the laser light proceeding towards the optical disc and that of the laser light reflected from the optical disc from each other, and a light receiving element for receiving the return laser light reflected back from the optical disc. The beam splitter generates astigmatic aberration in the return light beam. The relative positions of the first and second light sources of the light radiating means are set so that a straight line interconnecting a spot position of the first laser light illuminated on the optical disc and a spot position of the second laser light illuminated on the optical disc will be in a range of 45±15° with respect to a recording track of the optical disc. The light receiving element includes a plurality of light receiving sections obtained on splitting by a splitting line substantially parallel to the straight line projected on the light receiving unit, the straight line being such a line interconnecting the spot position of the first laser light illuminated on the optical disc and the spot position of the second laser light similarly illuminated on the optical disc. Each of the light receiving sections is split into four portions by a splitting line substantially parallel to the recording track on a signal recording surface of the optical recording medium and a splitting line substantially perpendicular thereto, to generate focussing error signals by an astigmatic method based on respective light receiving signals of the paired light receiving portions.

In a further aspect, the present invention provides an optical disc device for recording and/or reproducing signals in association with a plurality of optical discs of different types, in which the device includes a spindle motor for rotationally driving the optical disc, an optical head adapted for coping with the plural optical discs of different types and a signal processing circuit for generating playback signals and control signals based on signals detected by the optical head. The optical head includes light radiating means having a first light source for radiating the first laser light and a second light source for radiating the second laser light having a wavelength different from that of the first laser light, the first and second light sources being housed in the same package, the light radiating means selectively radiating the first laser light or the second laser light responsive to the type of the optical disc, an objective lens for converging the laser light from the light radiating means towards an optical disc, a beam splitter for separating the optical path of the laser light radiated from the light radiating means into the optical path of the laser light proceeding towards the optical disc and the optical path of the laser light reflected from the optical disc and a light receiving element for receiving the return laser light reflected back from the optical disc.

The relative positions of the first and second light sources of the light radiating means are so set that a straight line interconnecting a spot position of the first laser light illuminated on the optical disc and a spot position of the second laser light illuminated on the optical disc will be in a range of 45±15° with respect to a recording track of the optical disc. The light receiving element includes a plurality of light receiving portions obtained on splitting by a splitting line substantially parallel to a straight line projected on the light receiving means, the straight line being a line interconnecting a spot position of the first laser light illuminated on the optical disc and a spot position of the second laser light similarly illuminated on the optical disc. Each of the light receiving portions is split into four portions by a splitting line substantially parallel to the recording track on a signal recording surface of the optical recording medium and a splitting line substantially perpendicular thereto.

In the optical head according to the present invention, focussing error signals can be detected properly by the astigmatic aberration method, even with the use of a light radiating element selectively radiating laser light beams designed for coping with plural optical recording mediums, such as CD-R and DVD, thus enabling the overall size of the optical head to be reduced.

With the optical disc apparatus, according to the present invention, by employing this optical head, focussing control can be achieved properly to provide for proper focussing control and proper recording and/or reproduction of signals on or from the optical disc. On the other hand, the overall size of the apparatus can be reduced by reducing the optical head size.

DESCRIPTION OF THE PREFERRED EMBODIMENTS

Figure 1:
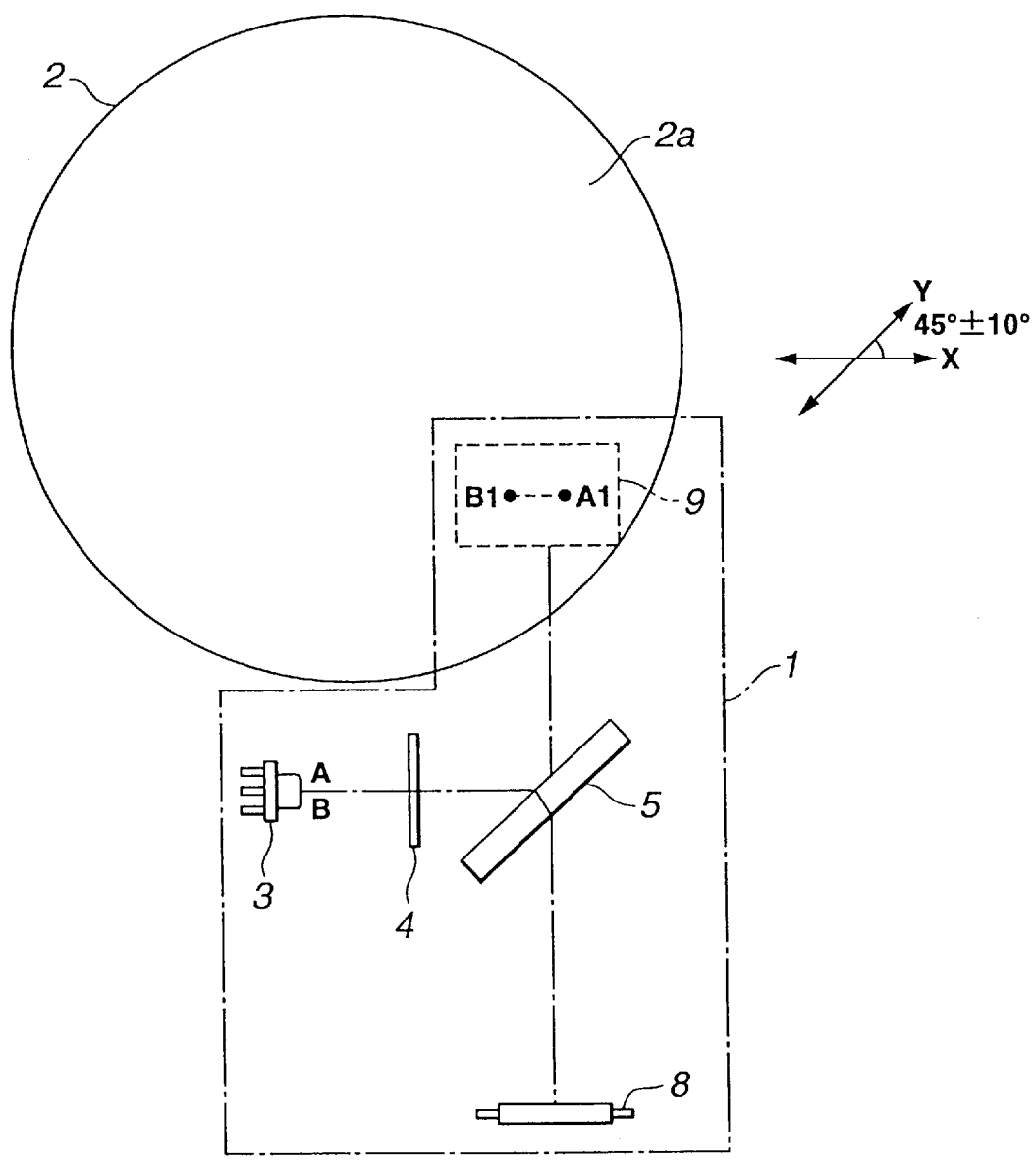
FIG. 1 is a schematic plan view showing an illustrative structure of an optical head embodying the present invention.

Referring to the drawings, preferred embodiments of the present invention will be explained in detail.

Figure 2:
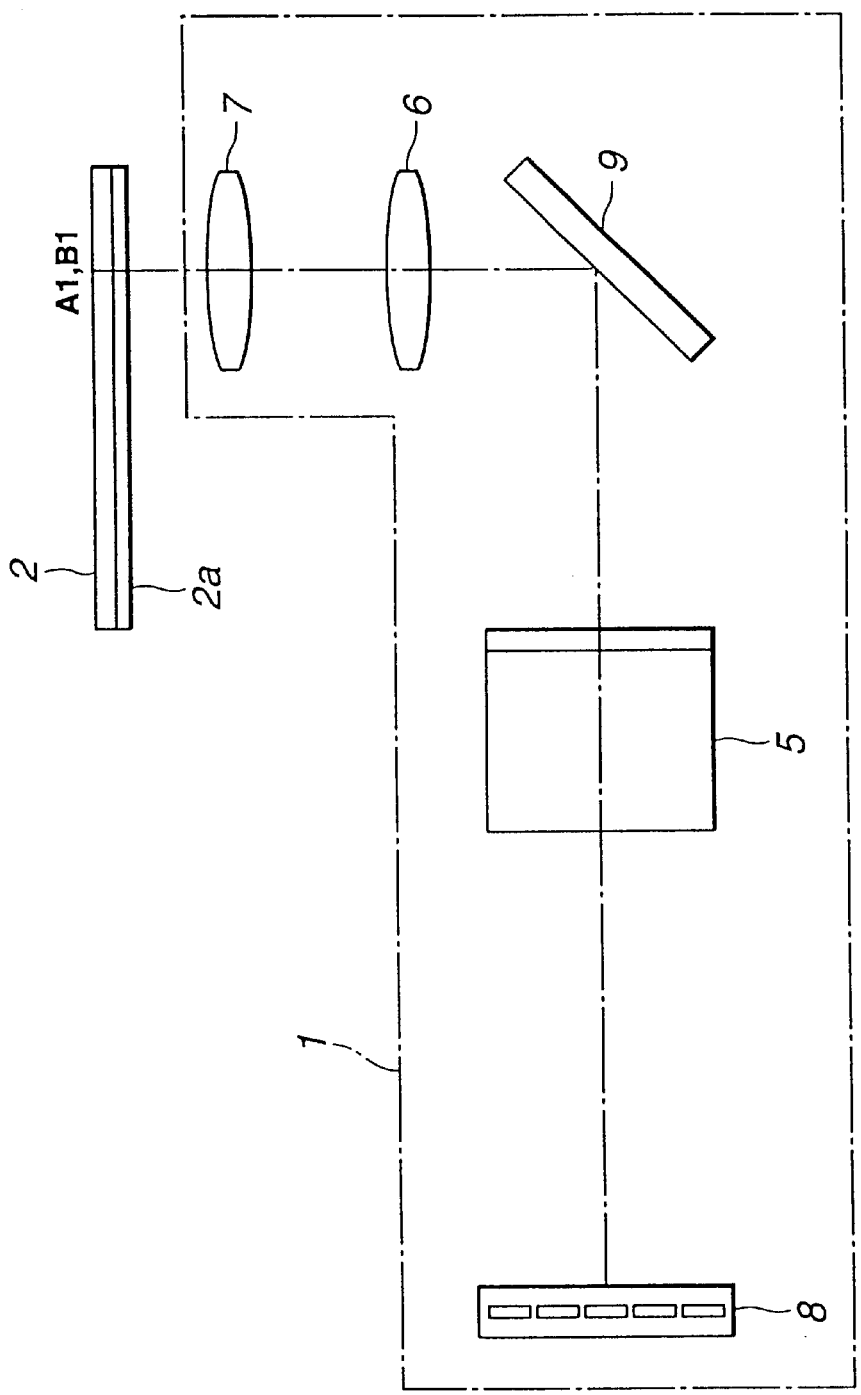
FIG. 2 is a schematic side view showing the structure of the optical head.

FIGS. 1 and 2 show an illustrative structure of an optical head 1 embodying the present invention.

This optical head 1 is adapted for coping with two sorts of optical discs 2, such as a CD-R (Compact Disc-Recordable) made up of a sole disc substrate with a thickness of 1.2 mm and a DVD (Digital Versatile Disc/Digital Video Disc) made up of two disc substrates, each 0.6 mm in thickness, stuck together, for recording and/or reproducing information, and using laser light beams of different wavelengths. FIG. 1 is a schematic plan view of the optical head 1 looking from a direction substantially perpendicular to a signal recording surface 2a of the optical disc 2, while FIG. 2 is a schematic side view of the optical head 1 looking from the direction substantially parallel to the signal recording surface 2a of the optical head 2.

This optical disc 1 includes a double-wavelength semiconductor laser 3, radiating laser light beams of two different laser light beams, a grating 4 for splitting the laser light beams radiated from the double-wavelength semiconductor laser 3 into plural portions, and a beam splitter 5 arranged in the optical path of the laser light passed through this grating 4. The optical disc 1 also includes a collimator lens 6 for transforming the laser light passed through the beam splitter 5 into parallel light, an objective lens 7 for converging the laser light transformed into the parallel light by the collimator lens 6 on the signal recording surface 2a of the optical disc 2 and a light receiving element 8 for receiving the laser light reflected back from the signal recording surface 2a of the optical disc 2.

On the optical path between the beam splitter 5 and the collimator lens 6 of the optical head 1 is arranged a mirror 9, so that the laser light transmitted through the beam splitter 5 is reflected and warped in optical path by this mirror 9 so as to be illuminated substantially at right angles to the signal recording surface 2a of the optical disc 2 arranged above the optical head 1.

Figure 3:
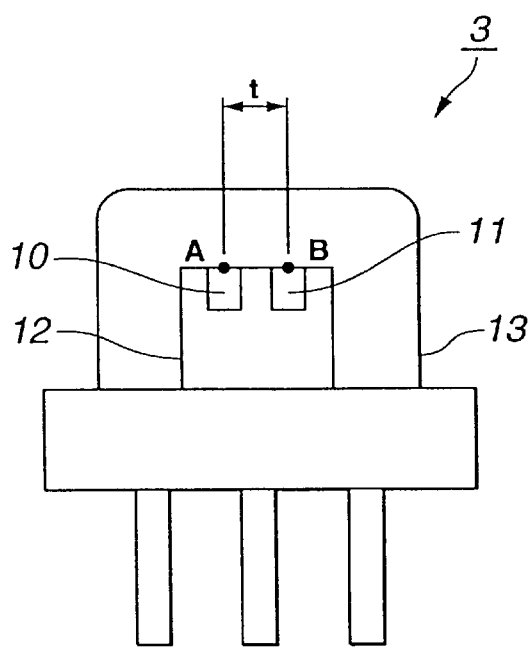
FIG. 3 is a see-through plan view showing a double-wavelength semiconductor laser of the optical head.

The double-wavelength semiconductor laser 3 is a light emitting element exploiting the recombination radiation of a seimconductor and is configured for selectively radiating laser light with a wavelength of approximately 780 nm, which is an optimum wavelength for a CD-R made up of a sole disc substrate with a thickness of 1.2 mm, or laser light with a wavelength of approximately 650 nm, which is an optimum wavelength for a DVD made up of two disc substrates, each with a thickness of 0.6 mm, bonded together. The laser light with the wavelength of approximately 780 nm and the laser light with the wavelength of approximately 650 nm are referred to below as the first laser light and the second laser light, respectively. Specifically, this double-wavelength semiconductor laser 3 includes a first laser chip 10 having a first light emitting point A for radiating the laser light coping with the optical disc 2, which is a CD-R, and a second laser chip 11 having a second light emitting point B for radiating the laser light coping with the optical disc 2, which is a DVD, as shown in FIG. 3. The double-wavelength semiconductor laser 3 is of a structure such that the first laser chip 10 and the second laser chip 11 are arranged on a base block 12, which base block 12 is housed within a package member 15. Meanwhile, in the double-wavelength semiconductor laser 3, the first laser chip 10 and the second laser chip 11 may be integrally molded to a sole laser chip.

In this double-wavelength semiconductor laser 3, the first laser chip 10 and the second laser chip 11 are arranged in proximity to each other on the base block 12, with the distance t between the first light emitting point A and the second light emitting point B being of the order of 80 to 200 µm. Thus, the first laser light and the second laser light radiated from the double-wavelength semiconductor laser 3 are illuminated on the optical disc 2 by substantially the same optical route.

The first laser chip 10 and the second laser chip 11 are arranged in a plane on the base block 12, which is substantially parallel to the signal recording surface 2a of the optical disc 2. So, from the double-wavelength semiconductor laser 3, the first laser light and the second laser light are radiated in a direction substantially parallel to the signal recording surface 2a of the optical disc 2.

The grating 4 is a diffracting grating, as shown in FIG. 1, and is configured for diffracting the laser light radiated from the double-wavelength semiconductor laser 3 to split the laser light into plural light beams inclusive of three light beams of the 0-order light beam and the ±1 order light beams. The laser light split by this grating 4 falls on the beam splitter 5. Meanwhile, the light beams of the laser light split by the grating 4, other than the 0 order light beam and the ±1 order light beams, are omitted in the following explanation.

The beam splitter 5 is a so-called substantially flat plate of a so-called mirror type and causes astigmatic aberration to be produced in the laser light passed through the beam splitter 5. This enables focussing error signals to be detected by the light receiving element 8, as later explained, in accordance with the astigmatic aberration method.

The beam splitter 5 reflects the laser light radiated from the double-wavelength semiconductor laser 3 to route the reflected light beam to the optical disc 2, while allowing the return light reflected back from the optical disc 2 to be transmitted therethrough to the light receiving element 8. This prevents the return light reflected back from the optical disc 2 from being reflected back towards the double-wavelength semiconductor laser 3.

The divergent laser light reflected by the beam splitter 5 is transformed by the collimator lens 6 into parallel light, which parallel light is converged by the objective lens 7 on the signal recording surface 2a of the optical disc 2, as shown in FIG. 2.

An objective lens 7 is supported for movement freely by a biaxial actuator, not shown. The objective lens 7 is moved by this biaxial actuator, based on tracking error signals and focussing error signals generated by the return light from the optical disc 2 received by the light receiving element 8, as later explained, in two directions, that is in a direction towards and away from the optical disc 2 and in a direction radially of the optical disc 2. The objective lens 7 converges the laser light radiated from the double-wavelength semiconductor laser 3, so that the laser light will be focussed on the signal recording surface 2a of the optical disc 2. The objective lens 7 also causes the converged laser light to follow the recording track formed on the signal recording surface 2a of the optical disc 2.

The laser light converged on the signal recording surface 2a of the optical disc 2 is illuminated so that a straight line interconnecting a spot position A1 of the first laser light radiated from the first laser chip 10 and a spot position B1 of the second laser light radiated from the second laser chip 11, that is the straight line shown by a dotted line in FIG. 1, will be substantially at an angle of 45±15° with respect to the recording track on the signal recording surface 2a of the optical disc 2. That is, in the double-wavelength semiconductor laser 3, the first laser chip 10 and the second laser chip 11 are arranged on the base block 12 so that the straight line interconnecting the spot position A1 of the first laser light and the spot position B1 of the second laser light, converged on the signal recording surface 2a of the optical disc 2, will be at an angle between 45°±15° with respect to the recording track on the signal recording surface 2a of the optical disc 2.

Also, in the double-wavelength semiconductor laser 3, the direction in which the light emitting point A of the first laser chip 10 and the light emitting point B of the second laser chip 11 are arrayed is substantially perpendicular to the straight line interconnecting the spot position A1 of the first laser light and the spot position B 1 of the second laser light, as shown in FIG. 1.

In the following explanation, the direction of the straight line interconnecting the spot position A1 of the first laser light and the spot position B1 of the second laser light, converged on the signal recording surface 2a of the optical disc 2, is indicated by an arrow X, while the direction of the recording track on the signal recording surface 2a of the optical disc 2 is indicated by arrow Y.

The laser light converged on the signal recording surface 2a of the optical disc 2 is collimated by being reflected by the signal recording surface 2a and by being passed through the objective lens 7. The return light reflected back from the optical disc 2 is converged by being passed through the collimator lens 6. The return light transmitted through the beam splitter 5 is incident on the light receiving element 8.

Figure 4:
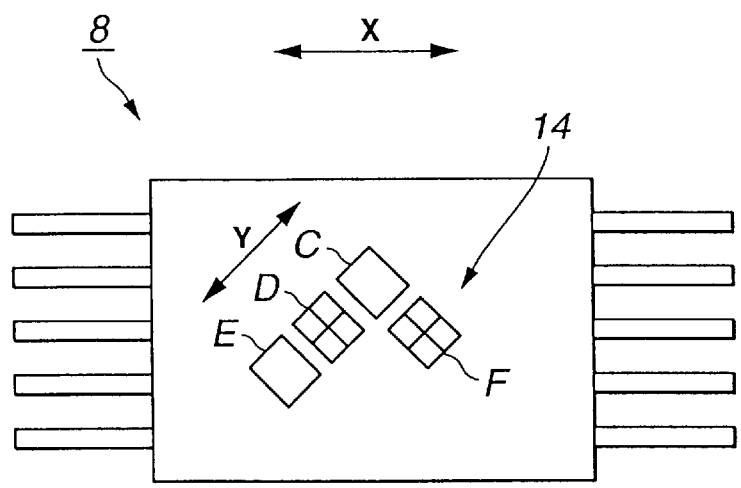
FIG. 4 is a plan view showing an illustrative structure of a light receiving element of the optical head.
Figure 5:
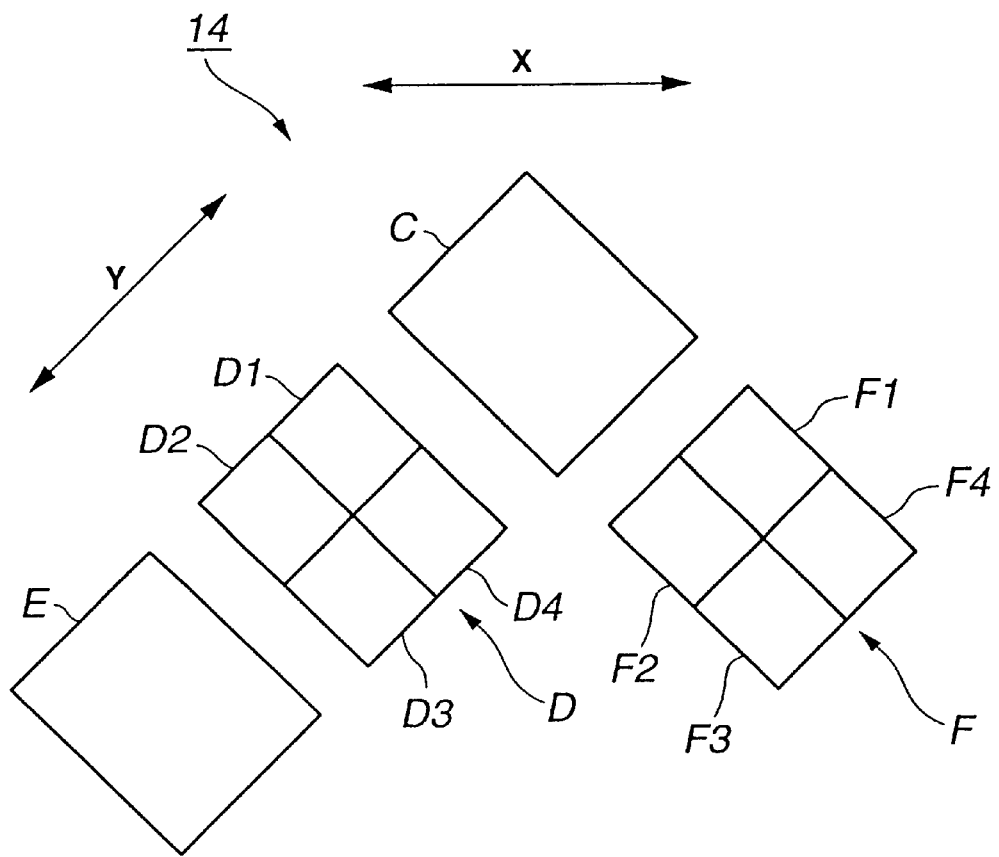
FIG. 5 is an enlarged schematic plan view showing a light receiving portion of the light receiving element.
Figure 6:
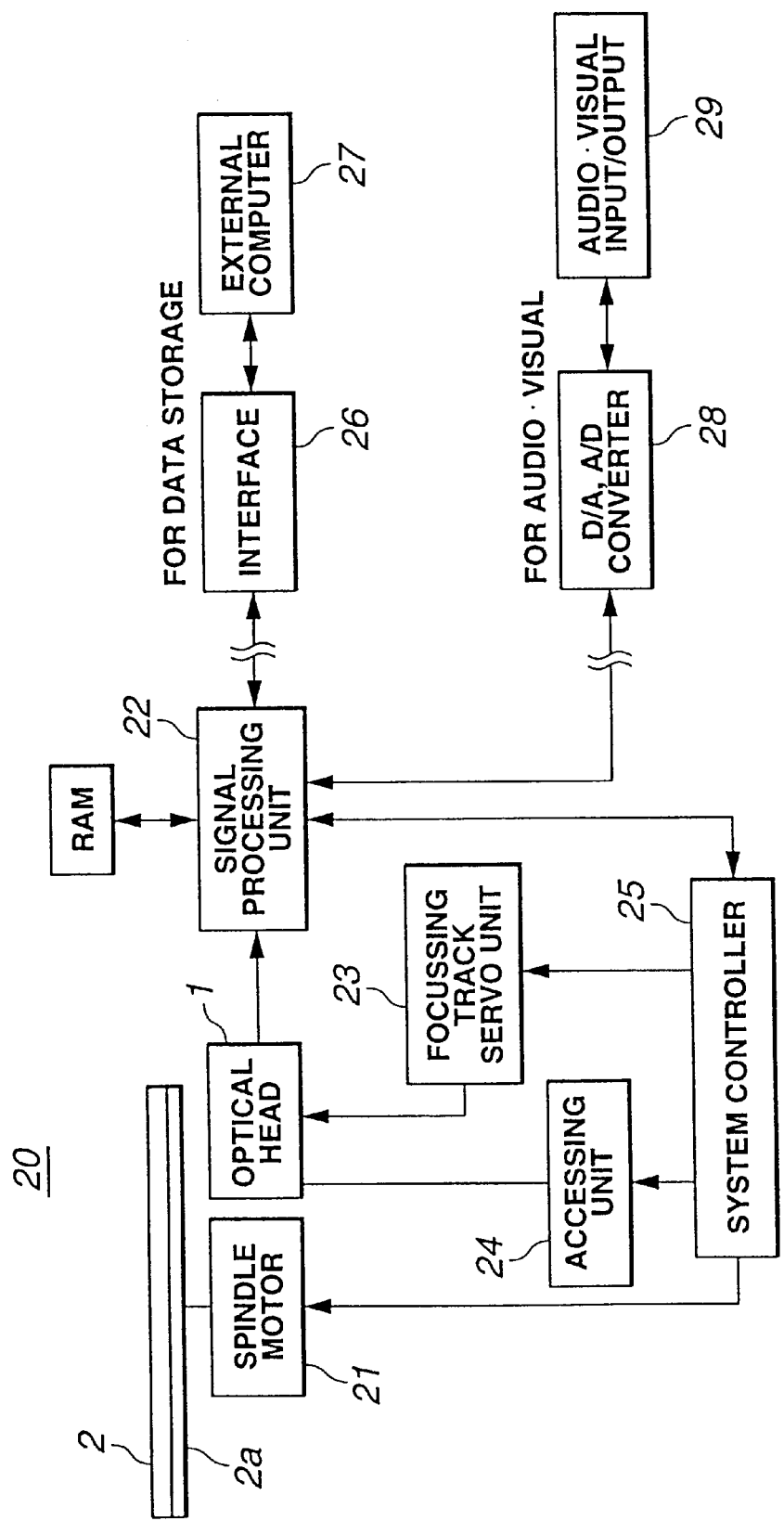
FIG. 6 is a block diagram showing the structure of an optical disc device carrying the optical head.

Referring to FIGS. 4 and 5, the light receiving element 8 includes a light receiving unit 14 and a voltage transforming circuit for transforming the current from the light receiving unit 14 into voltage. The light receiving unit 14 is adapted for receiving the return beam of the first laser light reflected back from the signal recording surface 2a of the optical disc 2 (CD-R) and the return beam of the second laser light reflected back form the signal recording surface 2a of the optical disc 2 (DVD) and is integrated with the voltage transforming circuit into one unit. Meanwhile, FIG. 5 is a schematic plan view showing the light receiving unit 14 of the light receiving element 8 of FIG. 4 to an enlarged scale.

In the light receiving element 8, the light receiving unit 14 includes a light receiving section C, adapted for receiving the +1 order light as a subsidiary beam among the 0 order light and the ±1 order light of the first laser light obtained on splitting by the grating 4, a light receiving section D for receiving the +1 order light as a subsidiary beam, and a light receiving section E for receiving the −1 order light as subsidiary light beam. These three light receiving sections C, D and E are arrayed along a direction corresponding to the direction Y of the recording track on the signal recording surface 2a of the optical disc 2.

The light receiving unit 14 includes a light receiving section F for receiving the 0 order light as a main beam among the 0 order light and the ±1 order light of the second laser light as split by the grating 4. This light receiving section F is arrayed substantially parallel to the light receiving section C along a direction substantially perpendicular to the direction Y of the recording track on the signal recording surface 2a of the optical disc 2.

These paired light receiving sections D and F are arrayed along a direction substantially parallel to the direction X of a straight line which interconnects the spot position A1 of the first laser light and the spot position B1 of the second laser light, converged on the signal recording surface 2a of the optical disc 2 and which is then projected on the light receiving unit 14.

The paired light receiving sections D and F are provided respectively with four light receiving portions D1, D2, D3 and D4 and F1, F2, F3 and F4, obtained on splitting each of the rectangular light receiving sections D, F by a spitting line substantially parallel to the direction Y of the recording track on the signal recording surface 2a of the optical disc 2 and by a splitting line substantially perpendicular thereto, so that the light receiving sections D, F each present the shape of the symbol + fitted in a square □.

The light receiving element 8 receives the return beam of the first laser light, reflected by the signal recording surface 2a of the optical disc 2 (CD-R), by the light receiving sections C, E, operating as side light receiving sections, to detect light reception signals used for generating the tracking error signals TR1 by the three-beam method. The light receiving element 8 also receives the return beam of the first laser light, reflected by the signal recording surface 2a of the optical disc 2 (CD-R), by the light receiving sections D to G, to detect light reception signals used for generating the playback signals RF1 and the focussing error signals FE1 by the Foucault method.

Specifically, if the light reception signals derived from the first laser light received by the light receiving portions C, D1, D2, D3, D4 and E of the light receiving element 8 are denoted SC, SD1, SD2, SD3, SD4 and SE, respectively, the playback signal RF1, the focussing error signals FE1 and the tracking error signals TR1 may be found by the following equations:

$RF1 = SC + SD1 + SD2 + SD3 + SD4 + SE$ $FE1 = (SD1 + SD3) - (SD2 + SD4)$ $TR1 = SC - SE.$

On the other hand, the light receiving element 8 receives the return light of the second laser light, reflected back from the signal recording surface 2a of the optical disc 2 (DVD) by the light receiving portion F, to detect light reception signals for generating the tracking error signals by the DPD (Differential Phase Detection) method and light detection signals for generating the focussing error signals by the astigmatic method.

Specifically, if the light reception signals, derived from the second laser light and which have been received by the light receiving portions F1, F2, F3, F4 of the light receiving element 8, are denoted SF1, SF2, SF3 and SF4, respectively, the playback signal RF2, focussing error signals FE2 and the tracking, error signals TR2 may be found by the following equations:

$RF2 = SF1 + SF2 + SF3 + SF4$ $FE2 = (SF1 + SF3) - (SF2 + SF4)$ $TR2 = (SF1 + SF4) - (SF2 + SF3).$

Meanwhile, if the splitting direction of the light receiving sections D, F is not along the direction corresponding to the recording track on the signal recording surface 2a of the optical disc 2, the first laser light and the second laser light, reflected back from the optical disc 2, is affected by push-pull signals, thus affecting detection of focussing error signals FE1, FE2 by the astigmatic aberration.

In the present embodiment, the light receiving elements D, F, receiving the first laser light and the second laser light, reflected back from the optical disc 2, are each divided into the shape of a symbol + fitted in a square mark □, with one of the lines of the symbol + extending along the direction Y corresponding to a recording track on the signal recording surface 2a of the optical disc 2.

In the present optical head, the return light of the first laser light reflected by the signal recording surface 2a of the optical disc 2 (CD-R) is received by the light receiving sections C and E arranged in the direction Y corresponding to the signal recording surface 2a of the optical disc 2 to detect the tracking error signals TR1 by the three-beam method.

It is, therefore, necessary to prevent the return light of the second laser light, reflected back from the signal recording surface 2a of the optical disc 2 (DVD), from leaking into the light receiving sections C or E adapted to receive the return beam of the first laser light.

So, in the present optical head 1, the paired light receiving sections D, F are arranged to extend substantially parallel to the direction X of the projection of a straight line interconnecting the spot position A1 of the first laser light converged on the signal recording surface 2a of the optical disc 2 and the spot position B1 of the second laser light converged on the signal recording surface 2a on the light receiving unit 14. Stated differently, the light receiving sections D and F are arranged so that the straight line interconnecting the spot position A1 of the first laser light converged on the signal recording surface 2a of the optical disc 2 and the spot position B1 of the second laser light is along a direction which forms an angle of 45±15° with respect to the recording track on the signal recording surface 1a of the optical disc 2.

So, with the present optical head, the return beam from the optical disc 2, illuminated by the first laser light outgoing from the first laser chip 9 of the double-wavelength semiconductor laser 3, can be properly received by the light receiving sections C, D and E of the light receiving element 8, with the result that the return light of the second laser light radiated from the laser chip 10 from the optical disc 2 may properly be illuminated on the light receiving section F of the light receiving element 8.

Therefore, with the present optical head 1, the focussing error signals exploiting the astigmatic aberration can be properly detected even with the use of the double-wavelength seimconductor laser 3 selectively radiating the laser light configured for accommodating both the CD-R and the DVD, thereby reducing the size of the entire optical head.

Meanwhile, in the present optical head 1, the relative positions of the first laser chip 9 and the second laser chip 10 are so set that the straight line interconnecting the spot position A1 of the first laser light radiated from the first laser chip 9 and the spot position B1 of the second laser light radiated from the second laser chip 10, indicated by a dotted line in FIG. 1, will be at an angle of 45±15° with respect to the recording track of the signal recording surface 2a of the optical disc 2.

If, at this time, the tolerance is of the order of ±15° with respect to the direction perpendicular to the recording track, there is no risk of adversely affecting the detection of the light reception signals used for generating the playback signals, focussing error signals or tracking error signals in the light receiving element 8.

Moreover, in the present optical head, in which the relative positions of the first laser chip 9 and the second laser chip 10 are set in a range of 45±15°, there is produced no adverse effect due to birefringence of the optical disc 2. So, it is unnecessary to provide a quarter wave plate in the optical path between the optical disc 2 and the double-wavelength semiconductor laser 3 to render it possible to reduce the overall size of the optical head.

The above-described optical head 1 is loaded on an optical disc device 20, adapted for coping with two types of the optical disc 2, such as a CD-R, made up only of a sole disc substrate with a thickness of 1.2 mm and a DVD made up of two optical discs, each with a thickness of 0.6 mm, bonded together, to record and/or reproduce the information using the first laser light and the second laser light differing in wavelength from each other.

The optical disc device 20 includes a spindle motor 21 for rotationally driving the optical disc 2, the above-mentioned optical head 1 for illuminating the laser light on the signal recording surface 2a of the optical disc 2 loaded on the spindle motor 21 and for detecting the return beam from the optical disc 2, and a signal processing circuit 22 for generating playback signals and control signals based on light reception signals detected by the optical head 1. The optical disc device 20 also includes a focussing/tracking servo unit 23 for performing focussing control and tracking control based on the control signals from the signal processing circuit 22 and an accessing unit 24 for causing the optical head 1 to be moved along the disc radius towards a preset recording track of the optical disc 2. Moreover, the optical disc device 20 includes a system controller 25 for controlling the spindle motor 21, focussing/tracking servo unit 23 and the accessing unit 24 based on the signal generated by the signal processing circuit 22.

The spindle motor 21 is driven under control by the system controller 25 to cause the optical disc 2 to be rotated at a pre-set speed.

The optical head 1 illuminates the laser light on the signal recording surface 2a of the optical disc 2, rotationally driven by the spindle motor 21, to detect the return beam reflected back from the signal recording surface 2a of the optical disc 2 to output the detected return beam to the signal processing circuit 22. At this time, the optical head 1 selectively outputs the above-mentioned first or second laser light, depending on the type of the rotating optical disc 2.

The signal processing circuit 22 demodulates the playback signals and the control signals, obtained based on the light detection signals detected by the optical head 1, by a signal demodulating unit, while correcting the signals for errors in an error correction unit.

The playback signals, demodulated and corrected for errors by the signal processing circuit 22, are transmitted through an interface 26 to e.g., an external computer 27. The playback signals, if used for audio-visual, are digital/analog converted by a D/A converting unit of the D/A and A/D converter 28, and thence supplied to an audio equipment 29.

The various control signals, demodulated by the signal processing circuit, are output to the system controller 25, which then drives the focussing/tracking servo unit 23 based on the focussing error signals and the tracking error signals among the control signals. The focussing/tracking servo unit 23 causes the biaxial actuator of the optical head 1 to be moved in two axial directions, that is in a direction towards and away from the optical disc 2 and in a direction along the disc radius, under control by the system controller 25, by way of performing the focussing control and the tracking control.

On the other hand, the accessing unit 24 feeds the optical head 1 along the disc radius, based on signals supplied from the system controller 25, to put the optical head 1 on a pre-set recording track of the optical disc 2.

In the above-described optical disc device 20, the focussing can be preformed properly, based on focussing error signals exploiting the astigmatic aberration, by loading the inventive optical disc thereon, thereby enabling the signal to be recorded and/or reproduced properly on or from the optical disc 2. Moreover, since the optical head is reduced in size, the overall device can be reduced in size.

What is claimed is:

1. An optical head for coping with a plurality of optical recording mediums of different types, comprising light radiating means including a first light source for radiating a first laser light and a second light source for radiating a second laser light having a wavelength different from that of said first laser light, said first and second light sources being housed in the same package, light converging means for converging the laser light from said light radiating means towards said optical recording medium, a beam splitter substantially in the form of a flat plate for separating the optical path of the laser light proceeding towards said optical recording medium from that of the laser light reflected from said optical recording medium, and for producing astigmatic aberration in the return laser light, and light receiving means for receiving the return laser light reflected back from said optical recording medium, wherein the relative positions of said first and second light sources of said light radiating means are so set that a straight line interconnecting a spot position of said first laser light illuminated on said optical recording medium and a spot position of said second laser light illuminated on said optical recording medium will be in a range of 45±15° with respect to a recording track of said optical recording medium, and wherein said light receiving means includes a pair of light receiving sections arranged substantially parallel to a straight line projected on said optical recording medium, said straight line being a straight line interconnecting a spot position of the first laser light illuminated on said optical recording medium and a spot position of the second laser light illuminated on said optical recording medium, each of the light receiving sections being split into four portions by a splitting line substantially parallel to the recording track on a signal recording surface of the optical recording medium and the splitting line substantially perpendicular thereto.

2. The optical head according to claim 1 wherein the separation between said first light source and the second light source is 80 to 200 µm.

3. The optical head according to claim 1 wherein said light receiving means generates focussing error signals by an astigmatic method based on respective light reception signals of said paired light receiving sections.

4. The optical head according to claim 1 wherein one of said paired light receiving sections receives a return beam of the first laser light radiated by the first light source and the other receives a return beam of the second laser light radiated from the second light source.

5. The optical head according to claim 1 wherein a diffraction grating is provided between said light radiating means and the beam splitter for splitting the laser light radiated from said light radiating means into a plurality of light beams including a main beam and a pair of subsidiary beams; and wherein said light receiving means includes a pair of light receiving sections on both sides of a direction substantially perpendicular to said projected straight line of said plural light receiving sections, said paired light receiving sections receiving said paired subsidiary beams, among said plural light beams split by said diffraction grating, to detect a light reception signal used for generating tracking error signals.

6. The optical head according to claim 1 further comprising
a light reflecting member arranged between said beam splitter and said light converging means for deflecting the laser light radiated from said radiating means in a direction parallel to a recording surface of said optical recording medium in a direction towards said light converging means.

7. The optical head according to claim 6 wherein said first and second light sources are arranged in a plane substantially parallel to the recording surface of said optical recording medium.

8. An optical head for coping with a plurality of optical discs of different types, comprising
a semiconductor laser including a first light source for radiating a first laser light and a second light source for radiating a second laser light having a wavelength different from that of said first laser light, said first and second light sources being housed in the same package in proximity to each other, said semiconductor laser selectively emitting said first laser light or the second laser light depending on the disc type,
an objective lens for converging the laser light from said seimconductor laser on said optical disc,
a beam splitter for separating the optical path of the laser light proceeding towards said optical disc and that of the laser light reflected from said optical disc from each other and for generating astigmatic aberration in the return laser light, and
a light receiving element for receiving the return laser light reflected back from said optical disc, wherein the relative positions of said first and second light sources of said light radiating means are so set that a straight line interconnecting a spot position of said first laser light illuminated on said optical disc and a spot position of said second laser light illuminated on said optical disc will be in a range of 45±15° with respect to a recording track of said optical disc, and wherein
said light receiving element includes a plurality of light receiving sections arranged substantially parallel to a straight line projected on said light receiving unit, said straight line being such a line interconnecting the spot position of said first laser light illuminated on said optical disc and the spot position of said second laser light similarly illuminated on said optical disc, each of the light receiving sections being split into four portions by a splitting line substantially parallel to the recording track on a signal recording surface of the optical recording medium and a splitting line substantially perpendicular thereto, to generate focussing error signals by an astigmatic method based on respective light receiving signals of said paired light receiving portions.

9. The optical head according to claim 8 wherein the separation between said first light source and the second light source is 80 to 200 µm.

10. The optical head according to claim 8 wherein one of said paired light receiving sections receives a return beam of the first laser light radiated by the first light source and the other receives a return beam of the second laser light radiated from the second light source.

11. The optical head according to claim 8 wherein a diffraction grating is provided between said light radiating means and the bean splitter for splitting the laser light radiated from said semiconductor laser into a plurality of light beams including a main beam and a pair of subsidiary beams, and wherein
said light receiving element includes a pair of light receiving sections on both sides of a direction substantially perpendicular to said projected straight line of said plural light receiving sections, said paired light receiving sections receiving said paired subsidiary beams, among said plural light beams split by said diffraction grating, to detect a light reception signal used for generating tracking error signals.

12. The optical head according to claim 8 further comprising:
a light deflecting member arranged between said beam splitter and the objective lens for deflecting the laser light radiated in a direction parallel to a recording surface of said optical recording medium from said light radiating means towards said objective lens.

13. The optical head according to claim 12 wherein said first and second light sources are arranged in a plane substantially parallel to the recording surface of said optical recording medium.

14. An optical disc device for recording and/or reproducing signals in association with a plurality of optical discs of different types, said device comprising
a spindle motor for rotationally driving said optical disc,
an optical head adapted for coping with said plural optical discs of different types, and
a signal processing circuit for generating playback signals and control signals based on signals detected by said optical head, said optical head including light radiating means having a first light source for radiating a first laser light and a second light source for radiating a second laser light having a wavelength different from that of said first laser light, said first and second light sources being housed in the same package, said light radiating means selectively radiating said first laser light or the second laser light responsive to the type of the optical disc, an objective lens for converging the laser light from said light radiating means towards an optical disc, a beam splitter for separating an optical path of the laser light radiated from said light radiating means into an optical path of the laser light proceeding towards said optical disc and an optical path of the laser light reflected from said optical disc, and a light receiving element for receiving the return laser light reflected back from said optical disc, wherein the relative positions of said first and second light sources of said light radiating means are so set that a straight line interconnecting a spot position of said first laser light illuminated on said optical disc and a spot position of said second laser light illuminated on said optical disc will be in a range of 45±15° with respect to a recording track of said optical disc; and wherein said light receiving element includes a plurality of light receiving sections arranged substantially parallel to a straight line projected on said light receiving means, said straight line being such a line interconnecting a spot position of said first laser light illuminated on said optical disc and a spot position of said second laser light similarly illuminated on said optical disc, each of the light receiving sections being split into four portions by a splitting line substantially parallel to the recording track on a signal recording surface of the optical recording medium and a splitting line substantially perpendicular thereto.

15. The optical disc device according to claim 14 wherein the separation between the first and second light sources is 80 to 200 μm.

16. The optical disc device according to claim 14 wherein said light receiving element generates focussing error signals by the astigmatic method based on light reception signals of said paired light receiving sections.

17. The optical disc device according to claim 14 wherein one of said paired light receiving sections receives a return beam of the first laser light radiated by the first light source and the other receives a return beam of the second laser light radiated from the second light source.

18. The optical disc device according to claim 14 wherein a diffraction grating is provided between said light radiating means and the beam splitter for splitting the laser light radiated from said light radiating means into a plurality of light beams including a main beam and a pair of subsidiary beams, and wherein said light receiving element includes a pair of light receiving sections of said plural light receiving sections on both sides of a direction substantially perpendicular to said projected straight line on the plural light receiving sections, said paired light receiving sections receiving said paired subsidiary beams, among said plural light beams split by said diffraction grating, to detect a light reception signal used for generating tracking error signals.

19. The optical disc device according to claim 14 further comprising a light deflecting member arranged between said beam splitter and the objective lens for deflecting the laser light radiated in a direction parallel to a recording surface of said optical disc from said light radiating means in a direction towards said light converging means.

20. The optical disc device according to claim 19 wherein said first and second light sources are arranged in a plane substantially parallel to the recording surface of said optical disc.

* * * * *